United States Patent
Dole

[19]

[11] Patent Number: 6,045,316

[45] Date of Patent: Apr. 4, 2000

[54] FIFTH WHEEL ROLLBACK TRAILER

[76] Inventor: Arthur Donald Dole, 6098 US 41 N., Palmetto, Fla. 34221

[21] Appl. No.: 09/350,675

[22] Filed: Jul. 12, 1999

Related U.S. Application Data

[60] Provisional application No. 60/094,187, Jul. 27, 1998.

[51] Int. Cl.[7] ..................................................... B60P 1/28
[52] U.S. Cl. ........................ 414/482; 414/477; 414/480; 280/423.1
[58] Field of Search ................................. 414/471, 474, 414/476, 477, 480, 482, 483, 485; 280/423.1, 414.1

[56] References Cited

U.S. PATENT DOCUMENTS

| | | | |
|---|---|---|---|
| 1,538,052 | 5/1925 | Mueller | 280/423.1 |
| 1,985,169 | 12/1934 | Howell et al. | 414/471 |
| 3,102,649 | 9/1963 | Whalen | 280/414.1 |
| 3,690,490 | 9/1972 | Hall | 414/458 |
| 4,456,420 | 6/1984 | Newhard | 414/477 |
| 4,770,592 | 9/1988 | Winter | 414/477 |
| 4,813,841 | 3/1989 | Eischen | 414/485 |
| 5,564,883 | 10/1996 | Swanner | 414/483 |

FOREIGN PATENT DOCUMENTS 2259688  3/1993  United Kingdom .................. 414/477

*Primary Examiner*—Dean J. Kramer
*Assistant Examiner*—Paul T. Chin
*Attorney, Agent, or Firm*—Frank A. Lukasik

[57] ABSTRACT

The invention is a fifth wheel rollback trailer consisting of three basic parts, a fifth wheel pull frame, a tilt frame, and a slide frame. The tilt frame is mounted on the pull frame above the axle and is tilted by a hydraulic cylinder. The slide frame is moved by a hydraulic cylinder fastened to the tilt frame.

1 Claim, 4 Drawing Sheets ns # FIFTH WHEEL ROLLBACK TRAILER

RELATED APPLICATION

This application is a Continuation-In-part of U.S. patent application Ser. No. 60/094,187, Filed Jul. 27, 1998.

BACKGROUND OF THE INVENTION

1. Field of the Invention

This invention relates generally to carriers or transporters and more particularly to a vehicle transporter which is usable for many different types of loads, such as, cars, farm equipment, wood, hay, etc.

2. Discussion of the Prior Art

There are numerous carriers and transporters available in the prior art. There are heavy duty carriers made of aluminum or steel having an independent hydraulic hitch or with a standard 4,000 lb. independent wheel lift equipped with a heavy duty deck and sub-frame rated at 14,000 lbs. Another transporter available features a 4 inch extruded double boxed aluminum deck and a full length sub-frame. Wreckers are available with an integrated boom and wheel lift system including a self-loading hookup. Other transporters are mounted on tandem axle chassis.

SUMMARY OF THE INVENTION

The present invention pertains to a fifth wheel rollback trailer consisting of three basic parts, a pull frame, a tilt frame, and a slide frame. The tilt frame is mounted above the axle on the pull frame. The pull frame is connected to the pulling truck as a fifth wheel. The trailer of the invention has a very low ground profile. The trailer bed is shorter than a goose neck trailer and has no lost room to carry the same load. It transports limousines, long cars and trucks, saves fuel because of low profile and less air resistance, and has a low angle for easy loading.

It is possible to use a 4-wheel or a 6-wheel truck to tow, is more affordable for big jobs, and jackknife's in parking lots to load easily. The weight can be adjusted on 10 tires, has a turning radius of 90 degrees on U-turning, and enables the driver to stay on ground to strap the load down safely. The trailer has another set of brakes, wheels that can go on bad terrain, and is easily disconnected from transport vehicles. The trailer is built for more load capacity, can transport two or more disabled vehicles, and has better control on turns with less leans.

The trailer can be used by more than one vehicle, eliminating the loss of use because of inoperable vehicle, and can carry taller loads because of low profile. The springs are on the top axle, with no loose U-bolts, it is more affordable for private use, and has drive-up loading.

DESCRIPTION OF THE PREFERRED EMBODIMENT

Figure 1:
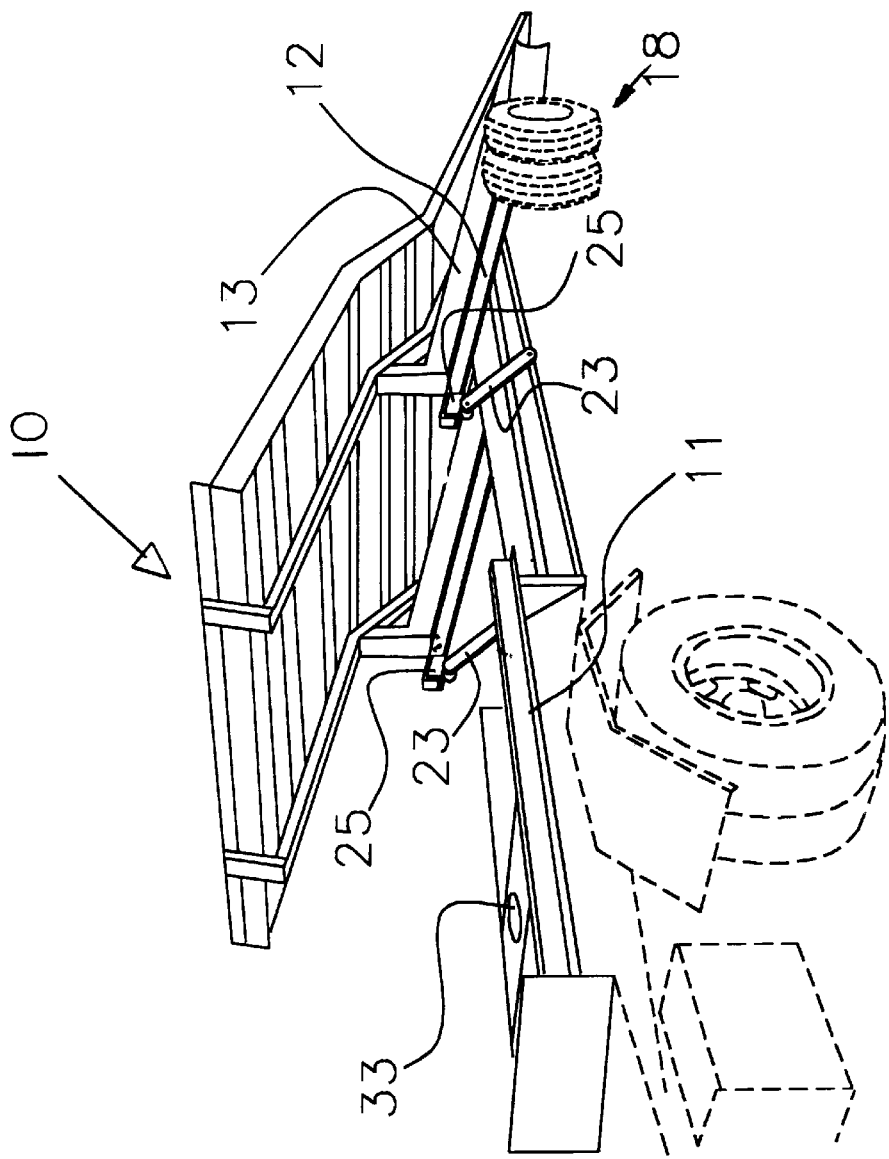
FIG. 1 is a front, bottom, perspective view of the fifth wheel rollback trailer in accordance with the invention.
Figure 2:
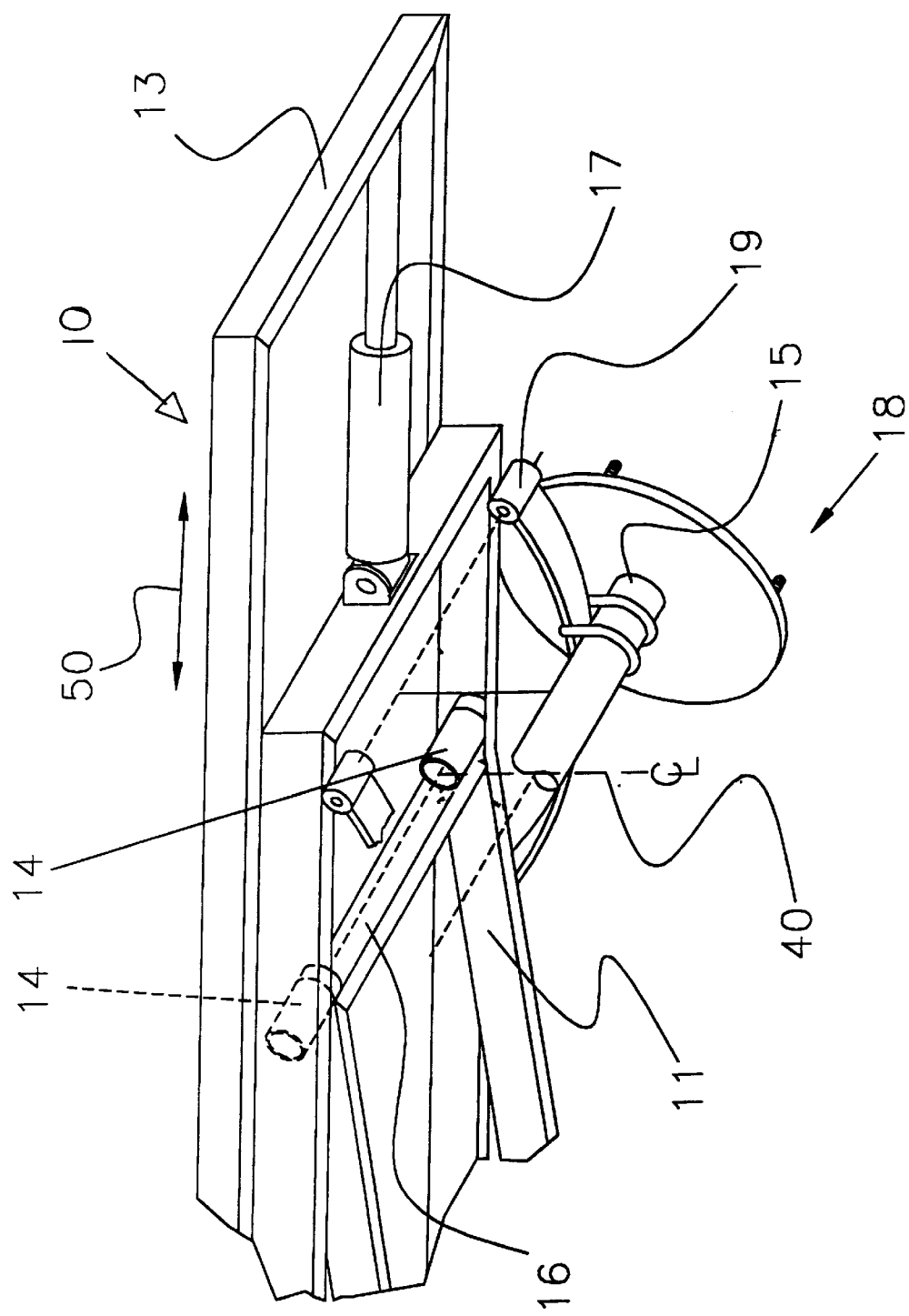
FIG. 2 is a rear, bottom, perspective view, partially in section, of the slide frame in accordance with the invention.
Figure 3:
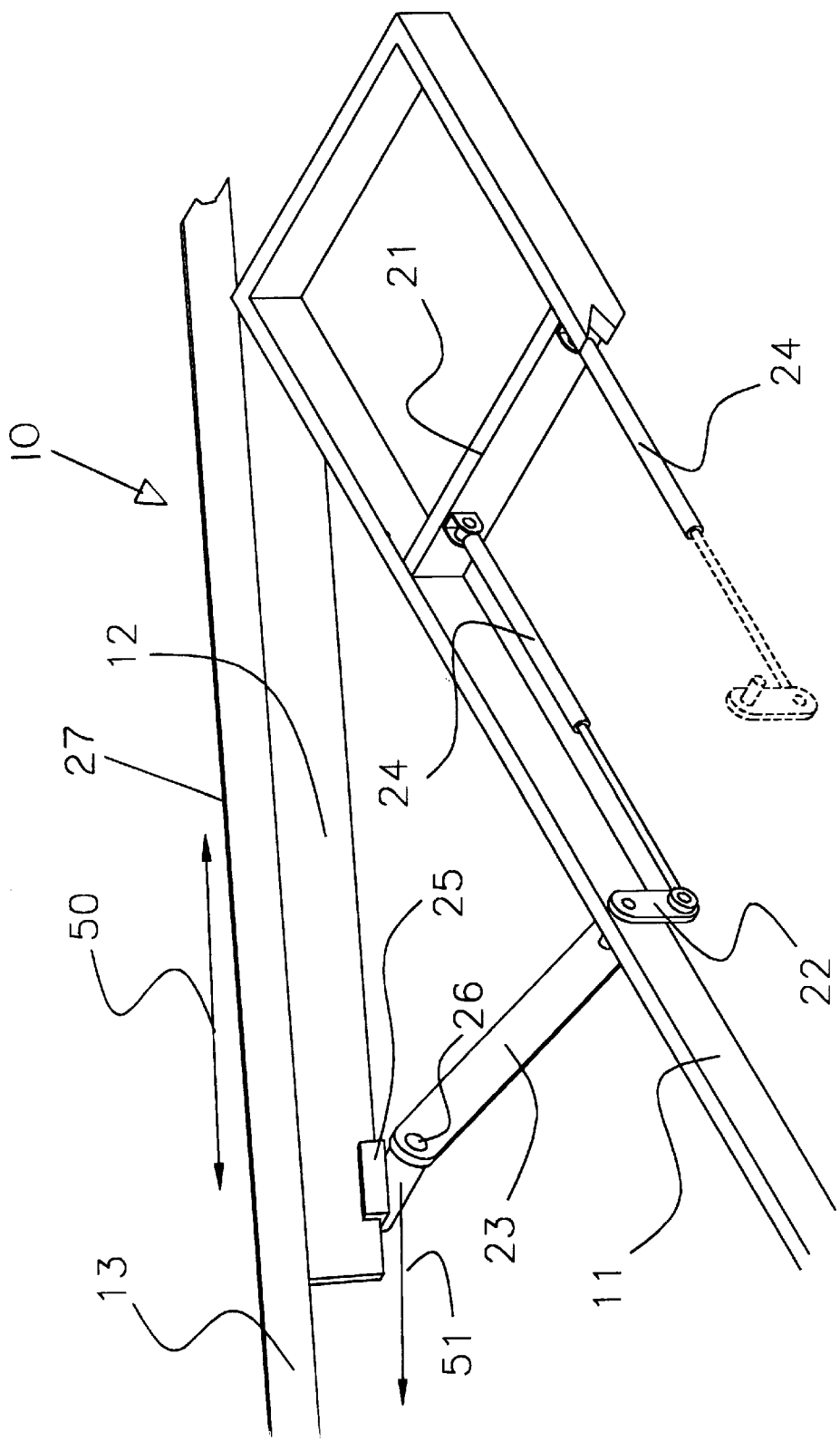
FIG. 3 is a top front, perspective cutaway view of the relationship between the pull frame, the tilt frame, and the slide frame in accordance with the invention.
Figure 4:
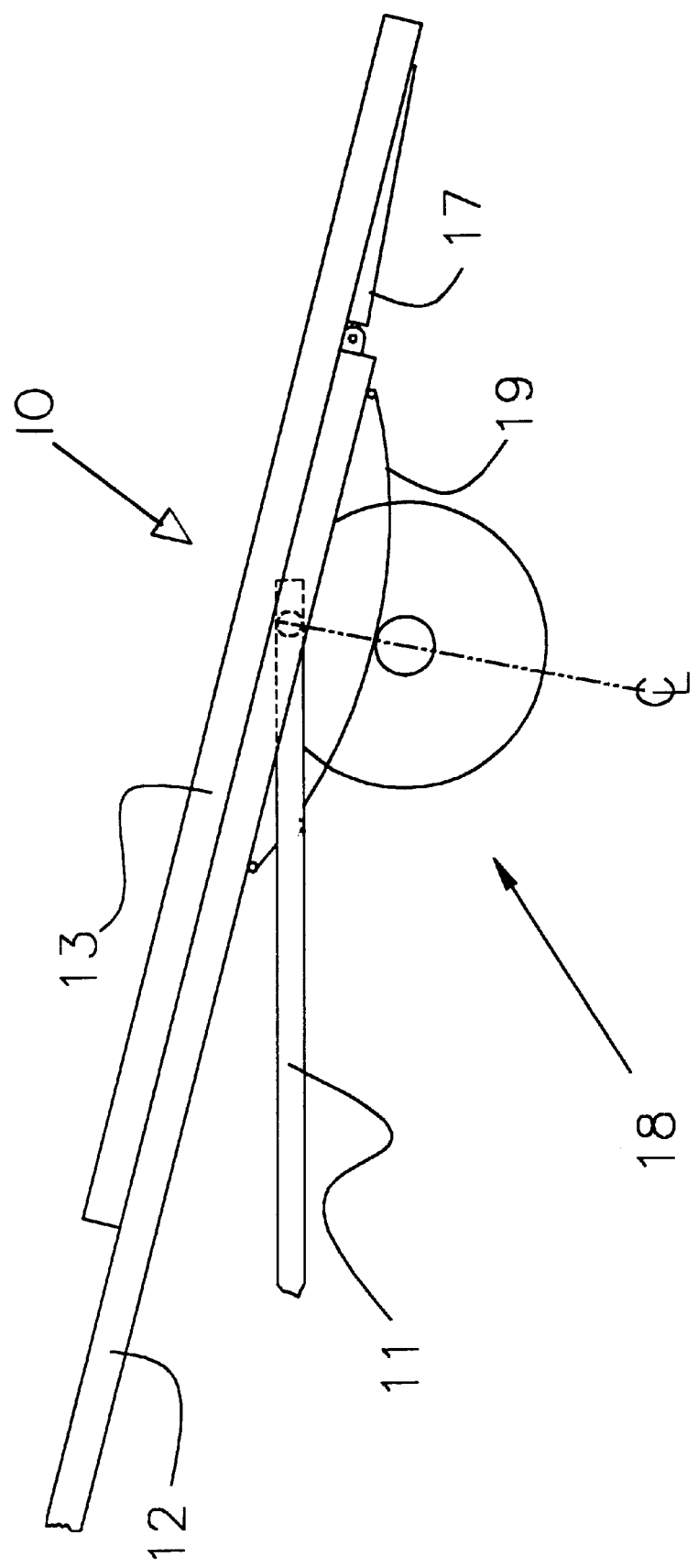
FIG. 4 is a side view of fifth wheel rollback trailer in accordance with the invention.

Referring now to the drawings wherein like numerals signify like parts there is shown in FIG. 1 a perspective view of the habitat fifth wheel rollback trailer, designated by the numeral 10 in accordance with the invention. The trailer 10 consists of the pull frame 11, the tilt frame 12, and a slide frame 13. The tilt frame 12 is pivoted on hinges 14 mounted above the axle 15, on pull frame 11. The pull frame 11 is connected to the pulling truck at fifth wheel 33.

Hinges 14 are fastened to the back end 16 of pull frame 11 and tilt frame 12. Slide frame 13 is guided on the top surface of tilt frame 12. Slide frame 13 is movably fastened to tilt frame 12 with hydraulic cylinder 17 which pushes and pulls slide frame 13 in a horizontal position. Wheel assembly 18 is fastened to tilt frame 12 with leaf springs 19. The wheel assembly 18, including axle 15 is fastened to tilt frame 12 with the axle 15 centered directly beneath the hinges 14. The leaf springs 19 are attached only to the tilt frame 12.

Forward of the hinges 14, a cross plate 21 is fastened between the two side frames of pull frame 11. Numeral 40 denotes the center line of the hinges 14. Further forward, a short lever arm 22 and a long lever arm 23 are pivotally mounted on opposite sides of the pull frame 11. A hydraulic cylinder 24 is pivotally mounted at the outward end of each short lever arm 22 and the opposite end of the hydraulic cylinder 24 is pivotally mounted on cross plate 21. The long lever arm 23 is pivotally mounted on tilt frame 12 with a "U" shaped bracket 25 having a rotatable bearing 26.

In operation, when the hydraulic cylinders 24 are extended, the tilt frame 12 is raised at an angle. When the hydraulic cylinders 24 are retracted, the tilt frame 12 returns to the horizontal position. When hydraulic cylinder 17 is extended, the slide frame 13 is pushed aft to the length of the hydraulic piston of hydraulic cylinder 17. Numeral 50 denotes the sliding motion of slide frame 13. The slide frame 13 is retracted with retraction of the piston of hydraulic cylinder 17.

The heavy duty deck 27 fastened to slide frame 13 may be built in the desired length and may be fabricated from aluminum or steel depending on the application. The small angle created by the deck 27 as it is grounded eliminates the need for a separate ramp for loading vehicles.

While the invention has been explained with respect to a preferred embodiment thereof, it is contemplated that various changes may be made in the invention without departing from the spirit and scope thereof.

What is claimed is:

1. A fifth wheel rollback trailer consisting of:

a pull frame having a front end, a back end, side frames, outside edges and an underside, a cross plate and an end plate fastened between said side frames, a pair of hinges mounted on said pull frame back end, one hinge on each of said side frames of said pull frame, a wheel assembly including an axle, a plurality of wheels, and a pair of leaf springs, said wheel assembly being suspended from said pull frame underside by said leaf springs, directly beneath said pair of hinges, a short lever arm and a long lever arm being pivotally mounted on each of said side frames, opposite each other, and having a rotatable bearing pivotally mounted on each of said long lever arms, each of said bearings having a "U" shaped bracket mounted thereon, a hydraulic cylinder having a first end pivotally mounted on each of said short lever arms and a second end pivotally mounted on said pull frame cross plate, a tilt frame having a back end and having opposite sides mounted parallel to each other, each of said sides having a top surface, said tilt frame being pivotally fastened to said pull frame on said pair of hinges mounted on said pull frame, a slide frame having a back end and having opposite sides mounted parallel to each other, each of said sides having a top surface and a bottom surface, said slide being slidably movable on said tilt frame top surfaces, said slide frame having a flat deck fastened to said sides top surface, and a hydraulic cylinder pivotally attached to said slide frame back end at a first end and pivotally attached to said tilt frame back end at a second end.

* * * * *